United States Patent
Callaway, Jr.

(10) Patent No.: US 8,340,166 B2
(45) Date of Patent: Dec. 25, 2012

(54) SMART GRID RADIO-FREQUENCY INTERFERENCE (RFI) DETECTION

(75) Inventor: Edgar H. Callaway, Jr., Boca Raton, FL (US)

(73) Assignee: Sunrise Micro Devices, Inc, Boca Raton, FL (US)

( * ) Notice: Subject to any disclaimer, the term of this patent is extended or adjusted under 35 U.S.C. 154(b) by 29 days.

(21) Appl. No.: 13/206,613

(22) Filed: Aug. 10, 2011

(65) Prior Publication Data

US 2012/0039403 A1    Feb. 16, 2012

Related U.S. Application Data

(60) Provisional application No. 61/372,636, filed on Aug. 11, 2010.

(51) Int. Cl.
*H04B 3/46* (2006.01)

(52) U.S. Cl. ........................... 375/224; 375/227

(58) Field of Classification Search .................. 375/224, 375/227
See application file for complete search history.

(56) References Cited

U.S. PATENT DOCUMENTS

| | | | |
|---|---|---|---|
| 5,564,095 A | 10/1996 | Arnstein et al. | |
| 7,368,918 B2 | 5/2008 | Henson et al. | |
| 2004/0058645 A1 | 3/2004 | Brenner | |
| 2006/0098724 A1 | 5/2006 | Tzannes et al. | |
| 2007/0124624 A1 | 5/2007 | Starr | |
| 2008/0024140 A1 | 1/2008 | Henson et al. | |
| 2008/0148084 A1 | 6/2008 | Haberie et al. | |
| 2010/0003924 A1 | 1/2010 | Sreerama et al. | |
| 2010/0056058 A1 | 3/2010 | Tinsley et al. | |
| 2010/0158169 A1 | 6/2010 | Sreerama et al. | |

OTHER PUBLICATIONS

PCT Search Report, PCT/US2011/047162, KIPO, Mar. 15, 2012.
Loftness, M., AC Power Interference Handbook, 3rd ed., ISBN 978-0-9653760-3-7, Ch. 1, Jan. 1, 2007, pp. 1-1 through 1-23.
Loftness, M., "RFI Source-locating on Power Lines—an Update", IEEE Transactions on Power Delivery, vol. 4, No. 2, Apr. 1989, pp. 1137-1144.
Chartier, V.1., Sheridan R., DiPlacido, J.N. and Loftness, M., "Electromagnetic Interference Measurements at 900 MHz on 230-kV Transmission Lines", IEEE Transactions on Power Delivery, vol. 1, No. 2, Apr. 1986, pp. 140-149.

*Primary Examiner* — Juan A Torres

(57) ABSTRACT

A method, system, network and device provide Smart Grid Radio Frequency Interference (RFI) detection. One or more symbols or chips present in one or more received radio frequency signals are detected and the presence of one or more erred symbols or chips in the detected one or more symbols present in the received one or more radio frequency signals determined. A correlation in time between the one or more erred symbols or chips and an infrastructure waveform associated with electrical infrastructure can be determined. When the determined correlation indicates the electrical infrastructure as a source of detectable radio frequency interference to a device, a pattern flag is generated. The pattern flag or pattern flag representation can be stored and/or transmitted.

35 Claims, 6 Drawing Sheets

SMART GRID RADIO-FREQUENCY INTERFERENCE (RFI) DETECTION

PRIORITY CLAIM

This application claims priority to U.S. Provisional Patent Application No. 61/372,636 filed Aug. 11, 2010, which is hereby incorporated herein by reference.

CROSS-REFERENCE TO RELATED APPLICATIONS

This application is related to co-pending U.S. patent application Ser. No. 13/206,605, and application Ser. No. 13/206,608, each filed on even date herewith, which are incorporated herein in their entireties.

BACKGROUND

Wireless Smart Grid systems could suffer severely from radio-frequency interference (RFI) caused by sparking noise sources associated with the electrical infrastructure. These sources are commonly not associated directly with the power conductors; rather, the air in small gaps between mounting hardware or other conductors in close proximity to the power conductors themselves (and therefore in their intense electrical field) breaks down at or near a maximum of the AC waveform and produces groups of short, high energy, high frequency impulses that have spectral components past 800 MHz (Mary Loftness, *AC Power Interference Handbook*, $3^{rd}$ ed., ISBN 978-0-9653760-3-7, Ch. 1). These impulses can cause severe interference to nearby radio and television receivers (the system essentially forms a spark transmitter using the power lines as an antenna), and therefore could be a significant problem for wireless smart grid networks. In addition, the presence of this interference is indicative of loose, weathered, or defective electrical hardware, which could represent a safety hazard to utility employees and the public and/or the potential for a service outage.

A principal difficulty with AC power-related RFI is that the impulses produce very wideband noise; their spectra frequently extend past 1 GHz. Since the lower-frequency spectral components have more energy in them, they frequently cause interference over a wider area than do the higher-frequency components; this can make the location of the source very difficult if one uses the lower frequencies exclusively in the search, especially when one considers the complex standing-wave pattern that can exist on the power lines.

The state-of-the-art method for locating AC power interference sources (Marvin O. Loftness, "RFI Source-locating on Power Lines—an Update," *IEEE Transactions on Power Delivery*, Vol. 4, No. 2, April 1989, pp. 1137-1144) is for the investigator to move up in frequency as he approaches the source, for better location discrimination. Starting at the frequency generating the complaint (usually HF or VHF), he moves up to UHF and finally 800 or 900 MHz (V. L. Chartier, R. Sheridan, J. N. DiPlacido, and M. O. Loftness, "Electromagnetic Interference Measurements at 900 MHz on 230-kV and 500-kV Transmission Lines," *IEEE Transactions on Power Delivery*, Vol. 1, No. 2, April 1986, pp. 140-149) for the final identification of the specific power pole containing the defect. Interestingly, these final frequencies (~900 MHz) used for pole-specific identification are also those expected to be used most often by wireless smart grid systems.

Existing known art related to the detection and correction of such conditions (e.g., U.S. Pat. No. 7,368,918 to Henson, et al.), rely on dedicated sensors to detect the interference.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
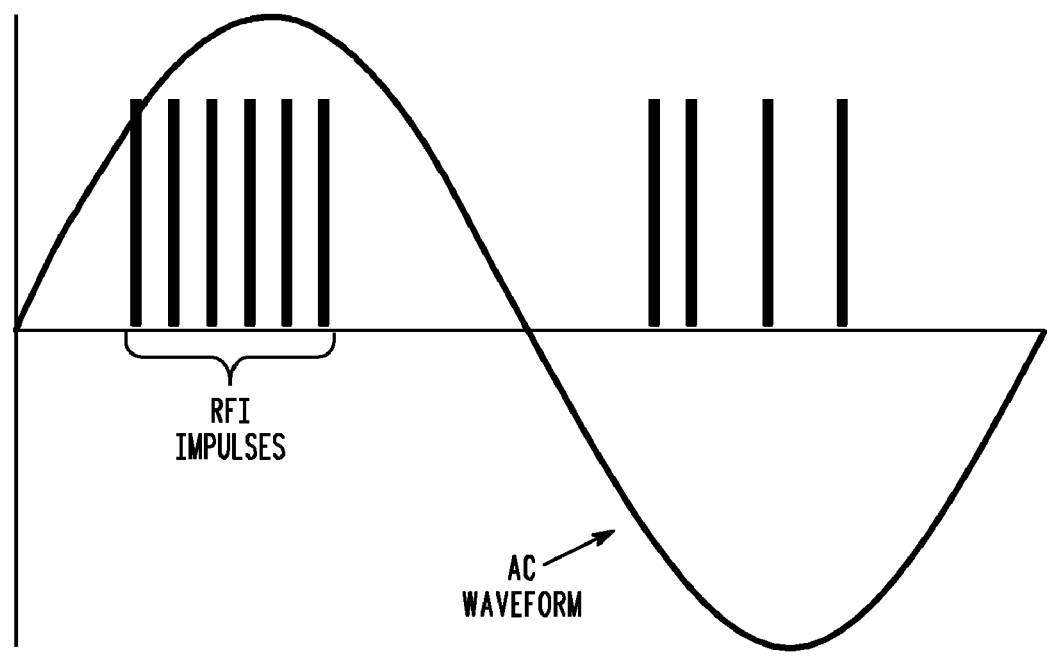
FIG. 1 illustrates a phase relationship between RFI pulses and an infrastructure waveform.

The various methods, systems, networks and devices described herein provide Smart Grid RFI detection. While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

One way in which an RFI detector may be implemented is to have the smart grid wireless device itself monitor the symbol errors it receives on its usual network traffic, and relate them to the AC waveform. The RFI impulses typically have a fixed phase relationship to the AC waveform, and the smart grid device could check for a similar relationship between its received symbol errors and the AC waveform. Detection of such a relationship could indicate the presence of RFI, which the device could then report to the utility for repair. Since the smart grid device is already a part of the network, the cost of this detector would be only the cost of some DSP code, and the airtime to send a report back to the utility.

A case of RFI may resemble FIG. 1, in which groups of RFI impulses typically have a fixed phase relationship with the AC waveform. However, the groups appearing on the positive side of the waveform may differ from those seen on the negative side, due to physical asymmetries in the sparking conductors. The RFI detector should therefore perform its comparisons and correlations over an entire period of the AC waveform for best results. This means that the detector should look for error bursts with a repetition rate of 60 Hz in a 60 Hz power grid, not 120 Hz. This rate is equivalent to a period of 16.67 ms, so a symbol rate of even 10 kbaud (having a symbol period of 100 μs) would provide sufficient granularity, having 166 symbols per AC waveform period.

Smart Grid noise detection systems employing direct sequence spread spectrum (DSSS) techniques can monitor chip errors, rather than symbol errors, for these periodic error groups caused by RFI impulses. Since the chip duration is substantially less than the symbol duration in DSSS systems, monitoring chip errors provides even better temporal granularity than monitoring symbol errors. In addition, because DSSS receivers demodulate by correlating a sequence of received chips to a set of expected chip sequences, they can tolerate a number of erred chips and still correctly demodulate the transmitted symbol. This means that a relatively mild case of RFI, causing a relatively small periodic group of chip errors, can be detected without disrupting Smart Grid communications, since the transmitted symbols still can be correctly received. In this manner, infrastructure faults may be detected at an early stage.

Since these impulses are high energy, but short duration, they could also be detected by monitoring the smart grid receiver's automatic gain control (AGC) values for periodic impulse groups. However, this method has the disadvantage that it does not discriminate between desired and undesired signal levels, and so may be somewhat less accurate.

Advantageously, the smart grid wireless communication protocol can operate in synchrony with the local AC waveform, at least to the extent that a device reporting RFI may receive packets during periods near zero-crossings of the AC waveform. These periods are typically interference-free, and would enable the device to continue functioning, at least to a limited extent, in the presence of AC power-associated RFI. (This would be a preferred method of reporting interference, for example.) Note that the device experiencing RFI may still transmit during periods of interference (as long as the destination device is not also experiencing RFI); it is only necessary to schedule receive periods of the device to occur near zero crossings or other interference-free periods of the infrastructure waveform. In this way, transmission of packets for the device is controlled to substantially avoid transmission of packets to the device during one or more interference periods characterized as having a determined correlation indicative of the electrical infrastructure as the source of detectable radio frequency interference to the device.

Figure 2:
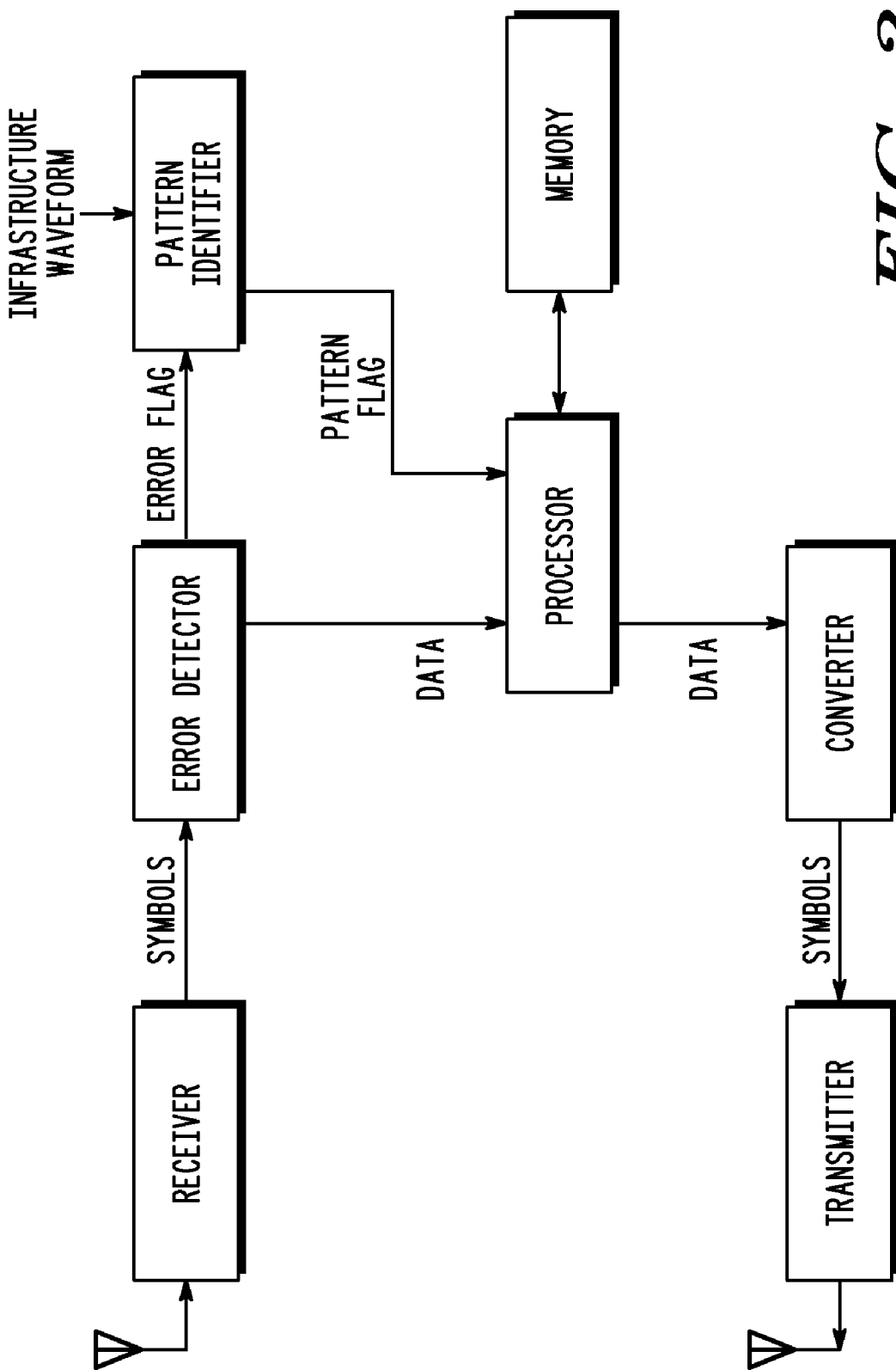
FIG. 2 is an exemplary block diagram illustrating RFI detection, in accordance with various representative embodiments.

A block diagram of an exemplary embodiment is shown in FIG. 2. In this embodiment, a Receiver receives radio-frequency signals from a receive antenna, and produces detected symbols that are passed to an Error Detector. The Error Detector determines in real time which, if any, of the received symbols has been received in error; correctly received symbols are converted to received data and forwarded to the Processor. In normal operation of a Smart Grid device, the Processor processes the received data using software instructions stored in a Memory, and produces transmit data that is then sent to a data-to-symbol Converter. Symbols are then sent to the Transmitter and transmitted via the transmit antenna.

When an error is detected in a received symbol, however, the Error Detector sends an error flag indication to the Pattern Identifier. The Pattern Identifier compares the timing of the incoming error flags to timing of its other input, an infrastructure waveform associated with electrical infrastructure, such as an AC waveform as discussed previously. The infrastructure waveform may be, for example, a 50- or 60-Hz signal conducted from the mains supply powering the device, a signal inductively coupled from nearby electrical infrastructure, a clock signal from which timing delays between symbol errors may be determined, or another source that supplies infrastructure waveform timing or phase information associated with electrical infrastructure.

The Pattern Identifier determines whether there is significant correlation between the arrival of received error flags and a phase of the infrastructure waveform, indicative of the electrical infrastructure as the source of cause of detectable radio frequency interference experienced by the device. This can be done, for example, by the use of a correlator to test whether the autocorrelation of the error flag sequence, the erred symbol sequence, has a maximum value that is substantially at a period of an infrastructure waveform (e.g., 16.67 ms), or whether the degree of correlation between the arrival of the error flag indication of the erred symbols and the phase of the infrastructure waveform exceeds a threshold value. Alternatively, a fast-Fourier transform may be taken of the error flag sequence, and the Pattern Identifier may determine that the transform contains a significant component substantially at a frequency of the infrastructure waveform (e.g., 60 Hz). Regardless of the method used, if the Pattern Identifier determines that such a correlation of interest exists (i.e., that RFI exists), it sends a pattern flag to the Processor.

When the Processor receives the pattern flag, it processes this information in accordance with the software instructions stored in the Memory. This may take the form of immediately sending a notice to the utility by transmitting a data message indicating a number of substantially interference-free periods the infrastructure waveform during which the device is available to receive packets, by waiting for confirmation of the event (in the form of repetitive pattern flags received, for example) before transmitting such a data message, or some other action, including simply storing the fact that the pattern flag was received, into Memory. Transmitting the pattern flag may mean transmitting a representation of the pattern flag rather than the actual pattern flag itself. Examples of a pattern flag representation may include a specific start-of-frame delimiter used in the transmitted packet, a specific packet header format or, when spread spectrum techniques are employed, a specific spreading code or hop sequence. Moreover, as used herein, the term Memory may refer to memory residing in the device, as in the case where the device simply stores the pattern flag representation in local memory, or may refer to memory external to the device, as in the case of memory residing at a base station or memory in another device with which the device is in communication, into which the pattern flag is stored. Storage of the pattern flag representation may include storage in local memory of the device as well as storage in external memory after the pattern flag representation is transmitted as part of a data message.

This pattern flag information may be useful, even if not immediately acted upon or used, because not all RFI is harmful RFI: If the node is many miles away from the nearest radio receiver (for example, on a transmission line in a National Forest), and if its own Smart Grid communication system reception is not unduly harmed by the RFI (e.g., if only one symbol per cycle of infrastructure waveform were in error), it is probably not economically feasible for the utility to repair the arcing component. In fact, the utility may only poll its network for evidence of RFI after an interference complaint is received from a customer. When such a polling message is received, the Processor may then extract its history of received pattern flags and send this data, or a summary of it, to the utility.

In an alternative embodiment, the error detection and pattern identification functions in FIG. 2 may be performed by software processing instructions that reside in the Memory and are executable by the Processor. Still further, these functions may also be performed by software residing in other memories that are executable by a second processor.

Figure 3:
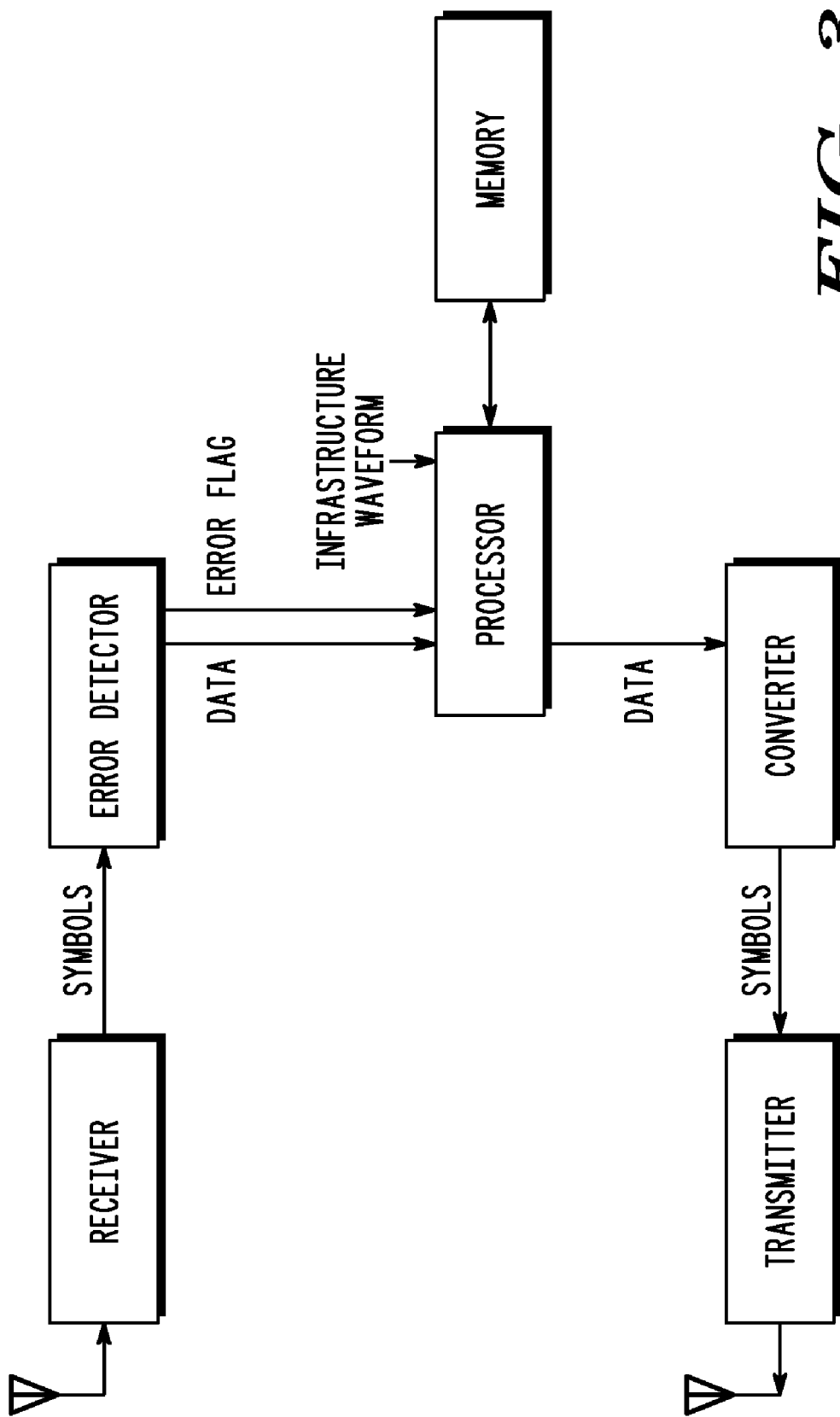
FIG. 3 is an exemplary block diagram illustrating RFI detection, in accordance with various other representative embodiments.

Another embodiment is shown in FIG. 3, in which the Processor records the occurrence in time, relative to the infrastructure waveform, of each error flag received, but the device does not perform any pattern identification. Instead, it transmits this timing information to an external entity that performs the pattern identification. Examples of the external entity include a base station of the utility, which may desire a centralized record of RFI data, and nearby nodes or devices within communication range of the device; such other nodes or devices in proximity of the device may have more processing capability than the device or node of interest. The external entity, whether it be a base station, external processor, or another device of node within communication range of the device, may generate a pattern flag when it determines that the correlation between the one or more erred symbols and an infrastructure waveform associated with electrical infrastructure indicates the electrical infrastructure as a source of detectable radio frequency interference to the device. The pattern flag or a pattern flag representation may then be stored and/or transmitted to control when packets are transmitted to the device, in order to substantially avoid transmission of packets to the device during times of interference. As previously discussed, transmitting the pattern flag may mean transmitting a representation of the pattern flag rather than the actual pattern flag itself in a data message. Examples of a pattern flag representation may include a specific start-of-frame delimiter used in the transmitted packet, a specific packet header format or, when spread spectrum techniques are employed, a specific spreading code or hop sequence.

Moreover, a first external entity may determine the plurality of substantially interference-free periods of the infrastructure waveform, while a second external entity distinct from the first external entity controls transmission of packets to the device during one or more of the plurality of substantially interference-free periods of the infrastructure waveform to substantially avoid transmission of the packets to the device during the one or more interference periods.

Therefore, in accordance with either FIG. 2 or FIG. 3, an electrical infrastructure noise detection system may at least comprise: a wireless receiver operable to receive one or more radio frequency signals and one or more symbols present in the one or more received radio frequency signals on a communication link; an error detector operable to detect the presence of one or more erred symbols of the one or more symbols; and a pattern identifier operable to determine a correlation in time between the one or more erred symbols and an infrastructure waveform associated with electrical infrastructure. When the determined correlation between the one or more erred symbols and the infrastructure waveform indicates the electrical infrastructure as a source of detectable radio frequency interference to a smart grid device in the noise detection system, the pattern identifier generates a pattern flag. The pattern flag and/or its pattern flag representation are useful to control transmission of packets to the smart grid device to substantially avoid transmission of the packets to the smart grid device during one or more interference periods having a determined correlation between the one or more erred symbols and the infrastructure waveform that indicates the electrical infrastructure as the source of detectable radio frequency interference to the smart grid device; nonetheless, the pattern identifier or pattern identifier functionality may be considered a correlator.

The pattern identifier may reside within the device of interest or that functionality may reside within an external entity. In the case where the pattern identifier does not reside within the device, a processor of the system is operable to record and transmit to an external entity the occurrence in time of receipt by the smart grid device of the one or more erred symbols and the infrastructure waveform, as shown in FIG. 2. The processor can transmit this recorded information to an external entity for correlation determination; again, the external entity may be a utility base station of the system or other devices within range.

Regardless of where correlation occurs, correlation in time between the one or more erred symbols and an infrastructure waveform associated with electrical infrastructure may be determined in a number of ways, such as by performance of a fast-Fourier transform of the one or more erred symbols of an erred symbol sequence, autocorrelation of the one or more erred symbols, or determination of a degree of correlation between arrival of the one or more erred symbols and a phase of the infrastructure waveform, previously described. Sufficient correlation may indicate the electrical infrastructure as the source of RF interference to the wireless network device and result in generation of a pattern flag. A representation of the pattern flag may be stored and/or transmitted; this information is useful to control transmission of packets to the wireless network device to substantially avoid transmission of the packets to the wireless network device during one or more interference periods.

Figure 4:
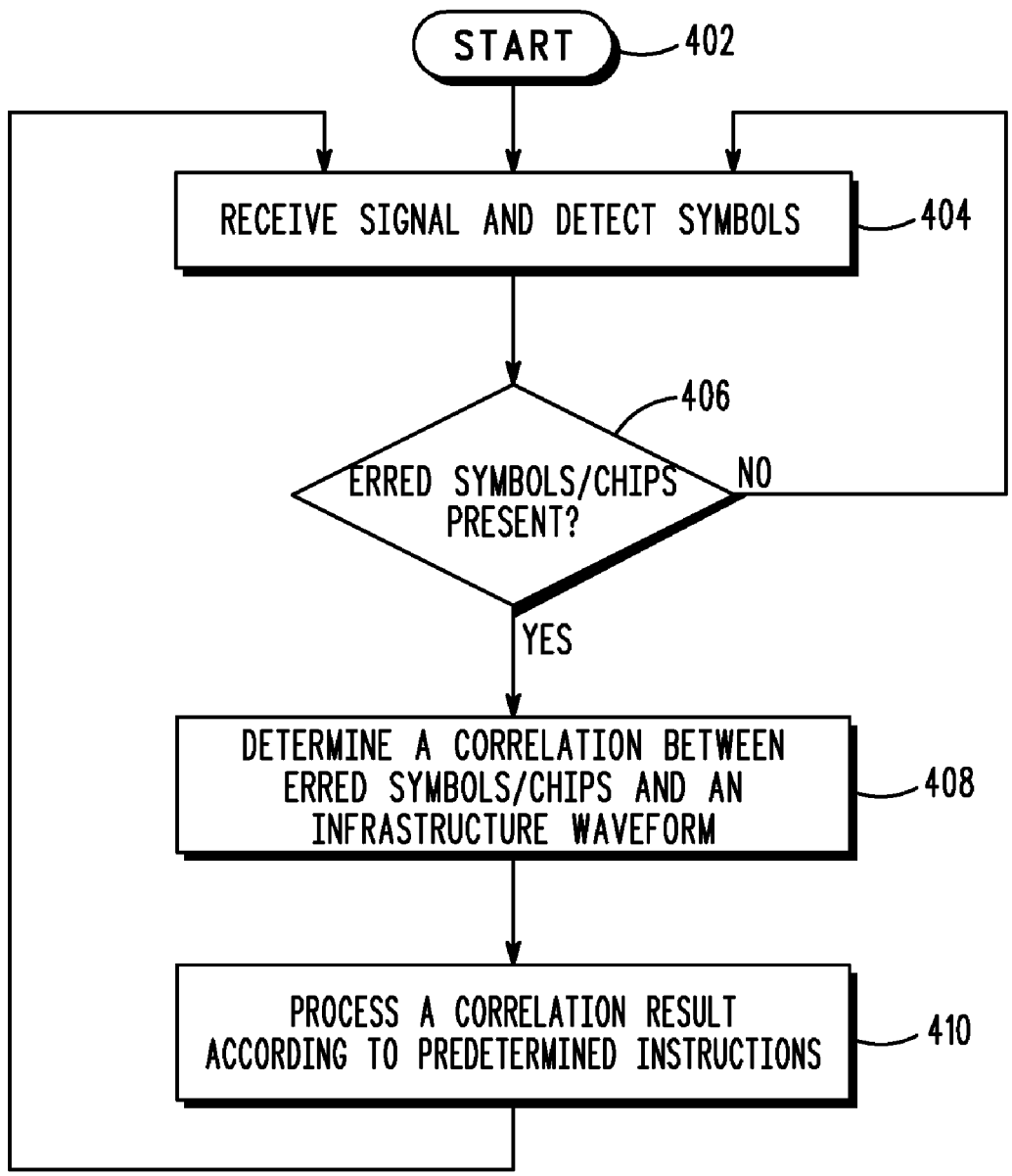
FIGS. 4 and 5 are flow diagrams of RFI detection, in accordance with certain representative embodiments.

An exemplary algorithm in accordance with various embodiments of the present invention is illustrated in flow 400 of FIG. 4. Starting at block 402, at block 404 a signal is received and symbols are detected. At block 406, the presence of any erred symbols or erred chips is determined. This determination can be made, for example, by the use of error-detecting codes, such as block codes, as well as cryptographic hashes, checksums, parity checks, and other techniques known to those of ordinary skill in the art. If no erred symbols or erred chips are present, flow returns to block 404. However, if erred symbols or erred chips are present, at block 408 a correlation in time between the erred symbols and erred chips and an infrastructure waveform is determined and, at block 410, action is taken based at least in part on the correlation result. Flow then returns to block 404. It is noted that the correlation determined at Block 408 may be a zero correlation, meaning that no correlation exists between the erred symbols or erred chips and the infrastructure waveform; the correlation, is existing, may be a positive or negative correlation. Moreover, the action taken at block 410 may be determined in accordance with software instructions stored in Memory. As previously discussed, action may include immediately sending a notice to the utility by transmitting a data message indicating a number of substantially interference-free periods the infrastructure waveform during which the device is available to receive packets, waiting for confirmation of the event (in the form of repetitive pattern flags received, for example) before transmitting such a data message, or some other action, including simply storing the fact that the pattern flag was received, into Memory.

Figure 5:
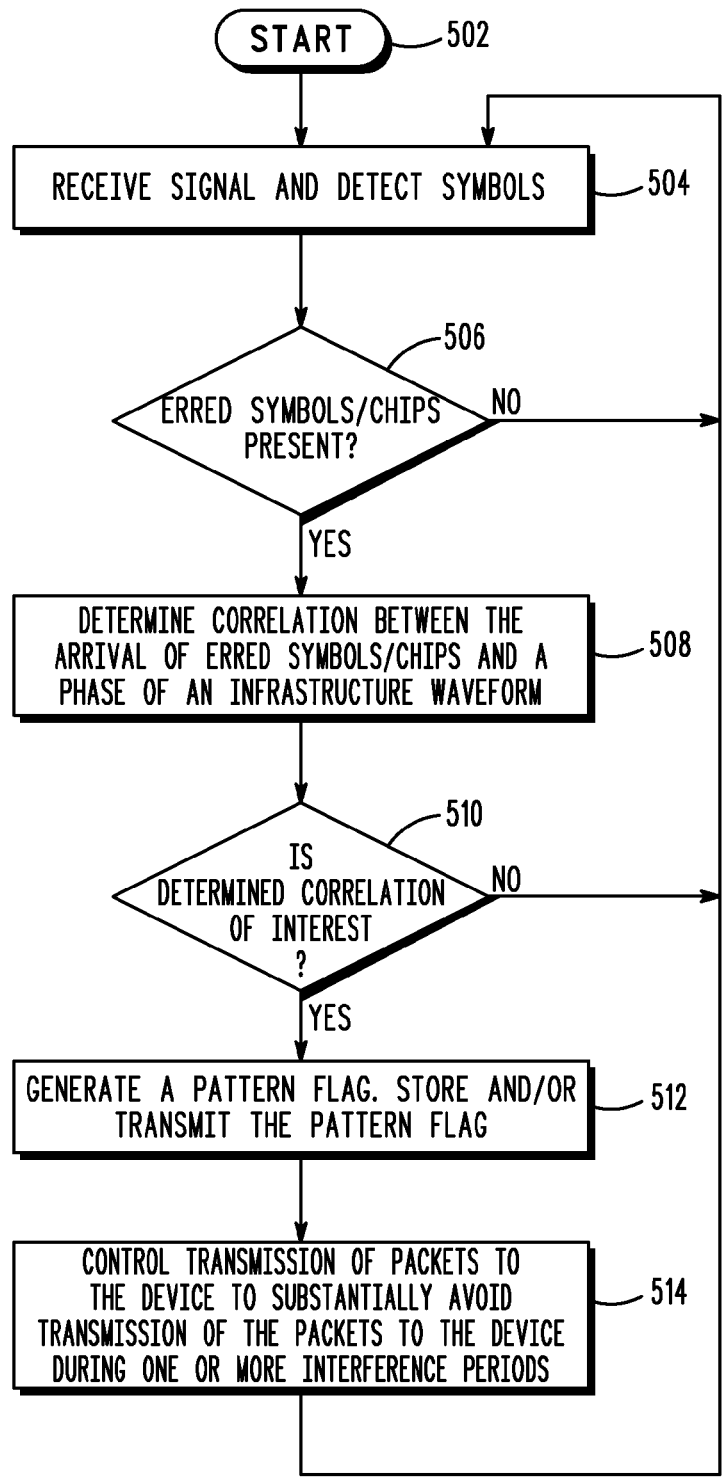

An exemplary algorithm in accordance with another embodiment of the present invention is illustrated in flow 500 of FIG. 5. Starting at block 502, at block 504 a signal is received and symbols are detected. At block 506, the presence of any erred symbols or erred chips is determined. This determination can be made, for example, by the use of error-detecting codes, such as block codes, as well as cryptographic hashes, checksums, parity checks, and other techniques known to those of ordinary skill in the art. If no erred symbols or erred chips are present, flow returns to block 504. However, if erred symbols or erred chips are present, at block 508 a correlation between the arrival of the erred symbols or erred chips and a phase of an infrastructure waveform associated with electrical infrastructure is determined. This determination can be made by determining a degree of correlation between the arrival of the erred symbols or erred chips and the phase of the infrastructure waveform associated with electrical infrastructure, and then determining if this degree of correlation is above a threshold value. Alternatively, an autocorrelation of the erred symbol or erred chip sequence may be performed and then it may be determined if the autocorrelation has a maximum value substantially at a period of the infrastructure waveform. Additionally, as previously discussed, a fast-Fourier transform of an erred symbol sequence or erred chip sequence can be performed and a determination of whether the transform comprises a component substantially at a frequency of the infrastructure waveform can be made. The correlation determination may be accomplished by a pattern identifier of a device or, as previously discussed, by an entity external to the device, in which case the processor of the device records the occurrence in time of receipt by the device of the erred symbols or erred chips and the infrastructure waveform and sends this timing information to the external entity for use by a pattern identifier of the external entity in the correlation determination.

If, at block 510, it is determined that no correlation exists or that insufficient correlation exists as to not be of interest, then flow returns to block 504. However, if correlation of interest is determined to exist, indicative of the electrical infrastructure as a source of interference to the device, at block 512 a pattern flag is generated, indicating that interference correlated to an infrastructure waveform is being experienced. The pattern flag or a pattern flag representation of the pattern flag may then be stored in memory, either by the device itself or in external memory, if the pattern flag is transmitted by the device and received by an external entity such as a utility base station or another device within communication range of the device of interest. At block 514, the Smart Grid device elects to receive data packets during periods near zero crossings or other interference-free periods of the infrastructure waveform, and flow then returns to block 504. As previously discussed, transmission of the pattern flag or pattern flag representation need not immediately result in the processor of the device sending a data message to a utility that the device is to only receive packets during interference-free periods; some other action, such as simply storing into Memory the fact that the pattern flag was received.

Control of transmission packets so as to substantially avoid transmission of the packets to the device during one or more interference periods is accomplished using the correlation information provided by the pattern flag or pattern flag representation generated by the pattern identifier, whether the pattern identifier functionality resides in the device itself or within an external entity. Transmission of packets to the device is controlled to occur during substantially interference-free periods of the infrastructure waveform, such as near zero-crossings of the infrastructure waveform.

From the above, it can be seen that a method of detecting electrical infrastructure noise, comprises: receiving one or more radio frequency signals and detecting one or more symbols present in the received one or more radio frequency signals; determining the presence of one or more erred symbols in the detected one or more symbols present in the received one or more radio frequency signals; determining a correlation in time between the one or more erred symbols and an infrastructure waveform associated with electrical infrastructure; when the determined correlation indicates the electrical infrastructure as a source of detectable radio frequency interference to a device, generating a pattern flag; and performing one or more of storing or transmitting a pattern flag representation of the pattern flag. As discussed and as further shown in FIGS. 4 and 5, the method may apply equally well to erred chips present in the detected symbols, as to erred symbols.

As previously mentioned, the correlation determination may be performed by pattern identifier functionality resident in a device of interest or external to the device as part of an external entity. For both approaches, the pattern flag representation when communicated beyond the network device, is useful for controlling transmission of packets to the device to substantially avoid transmission of the packets to the device during one or more interference periods, wherein during the one or more interference periods the determined correlation indicates the electrical infrastructure as the source of detectable radio frequency interference to the device.

The device may transmit a data message indicating a plurality of substantially interference-free periods, such as near zero-crossings of the infrastructure waveform, for example, of the infrastructure waveform during which the device is available to receive packets relatively free of interference. This data message need not be transmitted by the device immediately but upon the occurrence of some confirming event, such as the generation and receipt of multiple pattern flags. Or, an external device, given the recorded timing of receipt of the one or more erred symbols and the infrastructure waveform, may determine these substantially interference-free periods of the infrastructure waveform, and then transmit or allow packets to be transmitted to the network device during the substantially interference-free periods of the infrastructure waveform to substantially avoid transmission of the packets to the device during the one or more interference periods. Indeed, this determination and subsequent control of packet transmission need not be performed by the same external entity. A first external entity may determine the plurality of substantially interference-free periods of the infrastructure waveform while a second external entity distinct from the first external entity performs transmitting packets to the device during one or more of the plurality of substantially interference-free periods of the infrastructure waveform to substantially avoid transmission of the packets to the device during the one or more interference periods.

Regardless of where correlation occurs, correlation in time between the one or more erred symbols or erred chips and an infrastructure waveform associated with electrical infrastructure may be determined in a number of ways, such as by performance of a fast-Fourier transform of the one or more erred symbols of an erred symbol sequence, autocorrelation of the one or more erred symbols, or determination of a degree of correlation between arrival of the one or more erred symbols and a phase of the infrastructure waveform, previously described. Sufficient correlation may indicate the electrical infrastructure as the source of RF interference to the wireless network device and result in generation of a pattern flag. A representation of the pattern flag may be stored and/or transmitted; this information is useful to control transmission of packets to the wireless network device to substantially avoid transmission of the packets to the wireless network device during one or more interference periods. Again, the above applies equally well to erred chips present in the detected symbols, as to erred symbols.

Some wireless smart grid devices will be placed in residential and commercial power meters. Others will be placed on or near the electrical distribution infrastructure (e.g., a power pole) itself. This invention could be applicable in both locations, and be able to detect RFI generated in both customer equipment and on the electrical infrastructure. An example smart grid network including wireless devices employing the disclosed invention is shown in FIG. 6.

The wireless devices are placed along the grid, from the power plant to the home. Devices within range of the utility command and control center may communicate directly with it, while devices further away must have their messages relayed by other network devices. Should a source of RFI appear on the grid, for example on one of the distribution lines, with the disclosed invention it can be detected and its location precisely determined, and the information sent to the utility for early resolution. It is noted that a Smart Grid network may simply comprise the utility command and control center and the wireless network devices that communicate directly with it, without benefit of the substation and power plant. Such is the case in a distributed power generation approach in which the homes themselves generate the power, which never passes through a substation.

Examples of Smart Grid wireless devices include but are not limited to wireless devices in noise detection systems, such as Advanced Metering Infrastructure (AMI) systems that measure, collect and analyze energy usage in the grid and enable intelligent monitoring and control of power generation, transmission, distribution, and utilization; "net metering" systems that enable utility customers to generate their own power and place any surplus on the grid; and advanced information and control systems that communicate with the appliances in the home via Home Area Networks to use energy efficiently.

Figure 6:
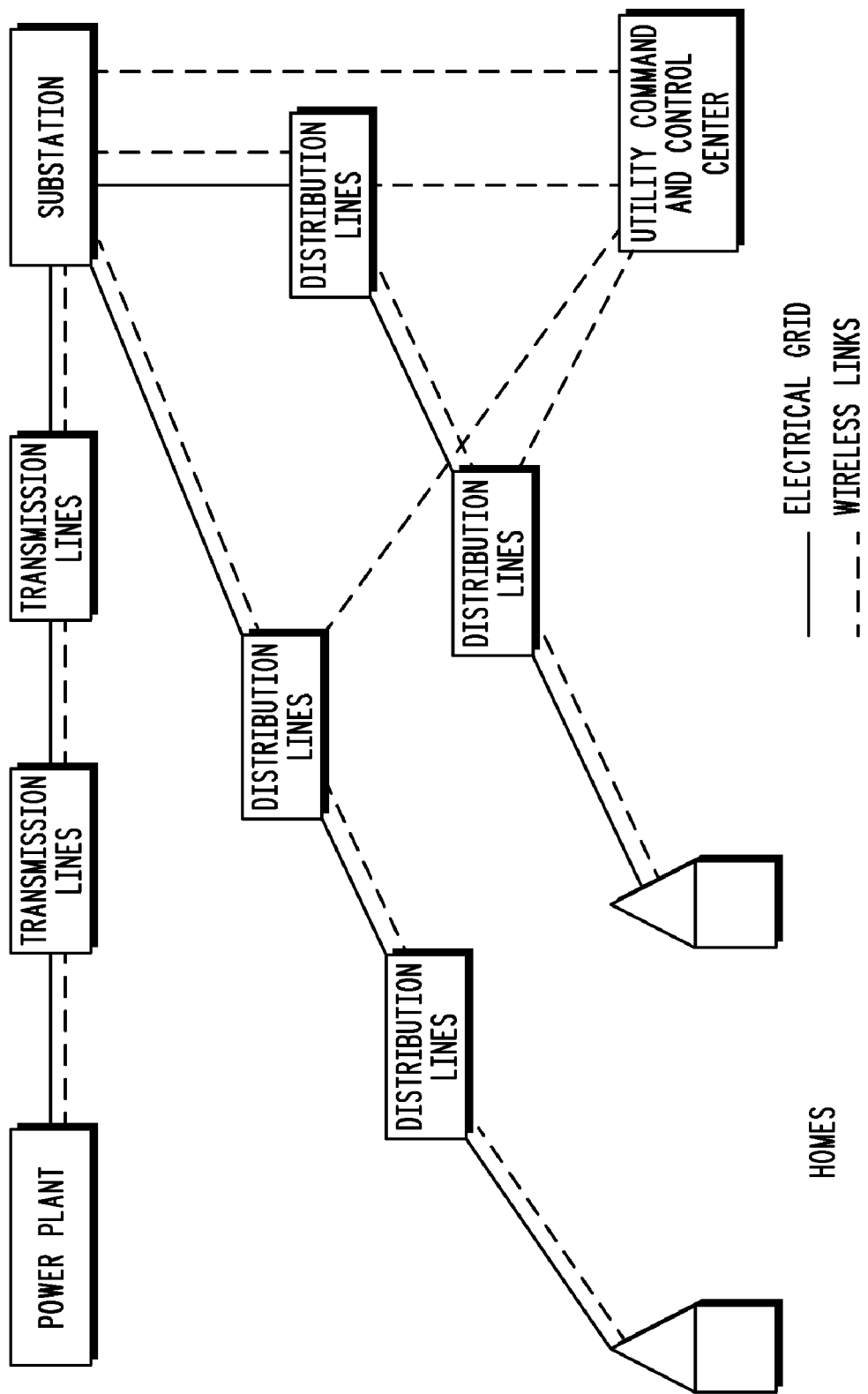
FIG. 6 is a block diagram of a Smart Grid network, in accordance with certain representative embodiments.

From the above it can be seen that a smart grid network may have a utility command and control center and a number of wireless network devices coupled to the utility command and control center; it may optionally have the power plant and substation elements shown in FIG. 6 as well. In accordance with various embodiments of a smart grid network, then, a wireless network device of the plurality of wireless network devices comprises various elements described and shown in FIGS. 2 and 3, for example: a wireless receiver operable to receive one or more radio frequency signals and one or more symbols present in the one or more received radio frequency signals on a communication link; an error detector operable to detect the presence of one or more erred symbols of the one or more symbols; and a pattern identifier operable to determine a correlation in time between the one or more erred symbols and an infrastructure waveform associated with electrical infrastructure of the Smart Grid network. When the determined correlation between the one or more erred symbols and the infrastructure waveform indicates the electrical infrastructure as a source of detectable radio frequency interference to the wireless network device, the pattern identifier generates a pattern flag. The pattern flag and/or a pattern flag representation of the pattern flag are usable to control transmission of packets to the wireless network device to substantially avoid transmission of the packets to the wireless network device during one or more interference periods having a determined correlation between the one or more erred symbols and the infrastructure waveform that indicates the electrical infrastructure as the source of detectable radio frequency interference to the wireless network device.

Wireless network devices within range of the utility command and control center may communicate directly with the utility command and control center, and wireless network devices not within range of the utility command and control center may communicate with the utility command and control center via other devices that are within range of the utility command and control center.

As previously discussed, the pattern identifier may reside within a wireless network device or external to the wireless network device with an external entity, and may be a correlator. In the case of the pattern identifier not as part of the wireless network device, but as part of an external entity, the network may further comprise a processor of the wireless network device operable to record and transmit to an external entity external to the wireless network device the occurrence in time of receipt by the smart grid device of the one or more erred symbols and the infrastructure waveform. The external entity may be one or more wireless network devices in communication range of the wireless network device or comprise the utility command and control center of the network.

Regardless of where the pattern identifier resides, it may determine correlation in time between the one or more erred symbols and an infrastructure waveform associated with electrical infrastructure of the Smart Grid network in a number of ways, such as by performance of a fast-Fourier transform of the one or more erred symbols of an erred symbol sequence, autocorrelation of the one or more erred symbols, or determination of a degree of correlation between arrival of the one or more erred symbols and a phase of the infrastructure waveform, previously described. Sufficient correlation may indicate the electrical infrastructure as the source of RF interference to the wireless network device and result in generation of a pattern flag. A representation of the pattern flag may be stored and/or transmitted; this information is useful to control transmission of packets to the wireless network device to substantially avoid transmission of the packets to the wireless network device during one or more interference periods. Again, the above teachings apply equally well to erred chips present in the detected symbols, as to erred symbols, in a Smart grid network.

In accordance with the teachings above, it can be seen that a wireless device operable in the system, network, or methodologies described above will have a wireless receiver operable to receive one or more radio frequency signals, one or more symbols present in the one or more received radio frequency signals on a communication link, and an infrastructure waveform associated with electrical infrastructure of a network; an error detector operable to detect the presence of one or more erred symbols of the one or more symbols; a processor operable to record the occurrence in time of receipt by the wireless device of the one or more erred symbols and the infrastructure waveform, wherein the recorded occurrence in time of receipt by the wireless device of the one or more erred symbols and the infrastructure waveform is usable to determine a correlation between the one or more erred symbols and the infrastructure waveform that indicates whether the electrical infrastructure is a source of detectable radio frequency interference to the wireless device; and a wireless transmitter operable to transmit under control of the processor.

If pattern identification is to be performed by an external entity, the processor controls the wireless transmitter to transmit to an external entity the occurrence in time of receipt by the smart grid device of the one or more erred symbols and the infrastructure waveform. This information is useful to the external entity to determine correlation between the erred symbols and the infrastructure waveform.

If, however, pattern identification is performed by the device, it further comprises a pattern identifier, as described above, that is able to determine the correlation in time between the one or more erred symbols and the infrastructure waveform associated with electrical infrastructure from the occurrence in time of receipt by the wireless device of the one or more erred symbols and the infrastructure waveform recorded by the processor; when the determined correlation between the one or more erred symbols and the infrastructure waveform indicates the electrical infrastructure as a source of detectable radio frequency interference to the wireless device, the pattern identifier generates a pattern flag. This pattern flag or its representation is usable to control transmission of packets to the wireless device to substantially avoid transmission of the packets to the wireless device during one or more interference periods having a determined correlation between the one or more erred symbols and the infrastructure waveform that indicates the electrical infrastructure as the source of detectable radio frequency interference to the wireless device.

Correlation by the device itself may be performed in a variety of approaches, discussed above. The pattern identifier may determine the correlation in time between the one or more erred symbols and the infrastructure waveform by determining a degree of correlation between arrival of the one or more erred symbols and the phase of the infrastructure waveform, so that a determined degree of correlation that exceeds a threshold value indicates the electrical infrastructure as the source of detectable radio frequency interference to the wireless device. Alternately, the pattern identifier may determine the correlation in time between the one or more erred symbols and the infrastructure waveform by determining an autocorrelation of the one or more erred symbols, wherein when the autocorrelation has a maximum value substantially at a period of the infrastructure waveform is indicative of the electrical infrastructure as the source of detectable radio frequency interference to the wireless device. Or, the pattern identifier may determine the correlation in time between the one or more erred symbols and the infrastructure waveform by performing a fast-Fourier transform of the one or more erred symbols, wherein a component of the fast-Fourier transform substantially at a frequency of the infrastructure waveform is indicative of the electrical infrastructure as the source of detectable radio frequency interference to the device. It is noted that the above device discussion applies equally well to erred chips present in the detected symbols, as to erred symbols.

A memory of the device may store the pattern flag representation. If the processor of the device controls the device wireless transmitter to transmit the pattern flag representation, it may be stored in an external memory. The pattern flag representation may be transmitted as part of a data message that indicates the substantially interference-free periods of the infrastructure waveform during which the packets should be transmitted to the device.

It will be appreciated that embodiments described herein may comprise microelectromechanical systems (MEMS) devices, mechanical structures and one or more conventional processors and unique stored program instructions of software and/or firmware programs that control the one or more processors to implement, in conjunction with certain non-processor circuits, some, most, or all of the functions described herein. Other non-processor circuits may include, but are not limited to signal drivers, clock circuits, power source circuits, and user input devices. As such, these functions may be interpreted as a method of detecting electrical infrastructure noise. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs, ICs and mechanical structures with minimal experimentation.

What is claimed is:

1. An electrical infrastructure noise detection system, comprising:
 a wireless receiver operable to receive one or more radio frequency signals and one or more symbols present in the one or more received radio frequency signals on a communication link;
 an error detector operable to detect the presence of one or more erred symbols of the one or more symbols; and
 a pattern identifier operable to determine a correlation in time between the one or more erred symbols and an infrastructure waveform associated with electrical infrastructure,
 wherein when the determined correlation between the one or more erred symbols and the infrastructure waveform indicates the electrical infrastructure as a source of detectable radio frequency interference to a smart grid device in the noise detection system, the pattern identifier generates a pattern flag,
 wherein one or more of the pattern flag and a pattern flag representation of the pattern flag are usable to control transmission of packets to the smart grid device to substantially avoid transmission of the packets to the smart grid device during one or more interference periods having a determined correlation between the one or more erred symbols and the infrastructure waveform that indicates the electrical infrastructure as the source of detectable radio frequency interference to the smart grid device.

2. The system of claim 1, wherein the pattern identifier is a correlator.

3. The system of claim 1, wherein the wireless receiver and the error detector reside in the smart grid device of the electrical infrastructure noise detection system.

4. The system of claim 3, wherein the pattern identifier does not reside in the smart grid device.

5. The system of claim 4, the system further comprising a processor of the smart grid device operable to record and transmit to an external entity the occurrence in time of receipt by the smart grid device of the one or more erred symbols and the infrastructure waveform.

6. The system of claim 5, wherein the external entity comprises one or more smart grid devices in communication range of the smart grid device.

7. The system of claim 5, wherein the external entity comprises a utility base station of the system.

8. The system of claim 1, wherein when the pattern identifier determines a fast-Fourier transform of the one or more erred symbols comprises a component substantially at a frequency of the infrastructure waveform, indicative of the electrical infrastructure as the source of detectable radio frequency interference to the smart grid device, the pattern identifier generates the pattern flag.

9. The system of claim 8, the system further comprising a processor and a first memory, wherein upon the component of the fast-Fourier transform substantially at the frequency of the infrastructure waveform, comprising one or more of the pattern identifier stores the pattern flag representation of the pattern flag in the first memory and the pattern identifier transmits the pattern flag representation to the processor.

10. The system of claim 9, wherein further to transmission of the pattern flag representation to the processor, the processor processes the pattern flag representation in accordance with processing instructions stored in a second memory of the system.

11. The system of claim 1, wherein the pattern identifier determines the correlation between the one or more erred symbols and the infrastructure waveform by determining whether a degree of correlation between arrival of the one or more erred symbols and a phase of the infrastructure waveform exceeds a threshold value, indicative of the electrical infrastructure as the source of detectable radio frequency interference to the smart grid device, and when the degree of correlation determined by the pattern identifier exceeds the threshold value, the pattern identifier generates the pattern flag.

12. The system of claim 11, the system further comprising a processor and a first memory, wherein when the determined degree of correlation exceeds the threshold value, comprising one or more of the pattern identifier stores the pattern flag representation of the pattern flag in the first memory and the pattern identifier transmits the pattern flag representation to the processor.

13. The system of claim 12, wherein further to transmission of the pattern flag representation to the processor, the processor processes the pattern flag representation in accordance with processing instructions stored in a second memory of the system.

14. The system of claim 1, wherein the pattern identifier determines the correlation between the one or more erred symbols and the infrastructure waveform by determining whether an autocorrelation of the one or more erred symbols has a maximum value substantially at a period of the infrastructure waveform, indicative of the electrical infrastructure as the source of detectable radio frequency interference to the smart grid device, and when the autocorrelation has a maximum value substantially at a period of the infrastructure waveform, the pattern identifier generates the pattern flag.

15. The system of claim 14, the system further comprising a processor and a first memory, wherein when the pattern identifier determines the autocorrelation of the one or more erred symbols has a maximum value substantially at a period of the infrastructure waveform, comprising one or more of the pattern identifier stores the pattern flag representation of the pattern flag in the first memory and the pattern identifier transmits the pattern flag representation to the processor.

16. The system of claim 15, wherein further to transmission of the pattern flag representation to the processor, the processor processes the pattern flag representation in accordance with processing instructions stored in a second memory of the system.

17. The system of claim 1, wherein the error detector is operable to detect the presence of one or more erred chips of the one or more symbols and the pattern identifier is operable to determine a correlation in time between the one or more erred chips and an infrastructure waveform associated with electrical infrastructure, wherein when the determined correlation between the one or more erred chips and the infrastructure waveform indicates the electrical infrastructure as a source of detectable radio frequency interference to a smart grid device in the noise detection system, the pattern identifier generates a pattern flag, and wherein one or more of the pattern flag and a pattern flag representation of the pattern flag are usable to control transmission of packets to the smart grid device to substantially avoid transmission of the packets to the smart grid device during one or more interference periods having a determined correlation between the one or more erred chips and the infrastructure waveform that indicates the electrical infrastructure as the source of detectable radio frequency interference to the smart grid device.

18. A Smart Grid network, comprising:
a utility command and control center; and
a plurality of wireless network devices coupled to the utility command and control center, wherein a wireless network device of the plurality of wireless network devices comprises:
a wireless receiver operable to receive one or more radio frequency signals and one or more symbols present in the one or more received radio frequency signals on a communication link;
an error detector operable to detect the presence of one or more erred symbols of the one or more symbols; and
a pattern identifier operable to determine a correlation in time between the one or more erred symbols and an infrastructure waveform associated with electrical infrastructure of the Smart Grid network,
wherein when the determined correlation between the one or more erred symbols and the infrastructure waveform indicates the electrical infrastructure as a source of detectable radio frequency interference to the wireless network device, the pattern identifier generates a pattern flag,
wherein one or more of the pattern flag and a pattern flag representation of the pattern flag are usable to control transmission of packets to the wireless network device to substantially avoid transmission of the packets to the wireless network device during one or more interference periods having a determined correlation between the one or more erred symbols and the infrastructure waveform that indicates the electrical infrastructure as the source of detectable radio frequency interference to the wireless network device.

19. The network of claim 18, wherein devices of the plurality of wireless network devices within range of the utility command and control center communicate directly with the utility command and control center, and wherein devices of the plurality of wireless network devices not within range of the utility command and control center communicate with the utility command and control center via other devices that are within range of the utility command and control center.

20. The network of claim 18, wherein the pattern identifier is a correlator.

21. The network of claim 18, wherein the pattern identifier does not reside in the wireless network device.

22. The network of claim 21, the network further comprising a processor of the wireless network device operable to record and transmit to an external entity external to the wireless network device the occurrence in time of receipt by the smart grid device of the one or more erred symbols and the infrastructure waveform.

23. The network of claim 22, wherein the external entity comprises one or more wireless network devices of the plurality of wireless network devices in communication range of the wireless network device.

24. The network of claim 22, wherein the external entity comprises the utility command and control center of the network.

25. The network of claim 18, wherein when the pattern identifier determines a fast-Fourier transform of the one or more erred symbols comprises a component substantially at a frequency of the infrastructure waveform, indicative of the electrical infrastructure as the source of detectable radio frequency interference to the wireless network device, the pattern identifier generates the pattern flag.

26. The network of claim 25, the network further comprising a processor and a first memory, wherein upon the component of the fast-Fourier transform substantially at the frequency of the infrastructure waveform, comprising one or more of the pattern identifier stores the pattern flag representation of the pattern flag in the first memory and the pattern identifier transmits the pattern flag representation to the processor.

27. The network of claim 26, wherein further to transmission of the pattern flag representation to the processor, the processor processes the pattern flag representation in accordance with processing instructions stored in a second memory of the network.

28. The network of claim 18, wherein the pattern identifier determines the correlation between the one or more erred symbols and the infrastructure waveform by determining whether a degree of correlation between arrival of the one or more erred symbols and a phase of the infrastructure waveform exceeds a threshold value, indicative of the electrical infrastructure as the source of detectable radio frequency interference to the wireless network device, and when the degree of correlation determined by the pattern identifier exceeds the threshold value, the pattern identifier generates the pattern flag.

29. The network of claim 28, the network further comprising a processor and a first memory, wherein when the determined degree of correlation exceeds the threshold value, comprising one or more of the pattern identifier stores the pattern flag representation of the pattern flag in the first memory and the pattern identifier transmits the pattern flag representation to the processor.

30. The network of claim 29, wherein further to transmission of the pattern flag representation to the processor, the processor processes the pattern flag representation in accordance with processing instructions stored in a second memory of the network.

31. The network of claim 18, wherein the pattern identifier determines the correlation between the one or more erred symbols and the infrastructure waveform by determining whether an autocorrelation of the one or more erred symbols has a maximum value substantially at a period of the infrastructure waveform, indicative of the electrical infrastructure as the source of detectable radio frequency interference to the wireless network device, and when the autocorrelation has a maximum value substantially at a period of the infrastructure waveform, the pattern identifier generates the pattern flag.

32. The network of claim 31, the network further comprising a processor and a first memory, wherein when the pattern identifier determines the autocorrelation of the one or more erred symbols has a maximum value substantially at a period of the infrastructure waveform, comprising one or more of the pattern identifier stores the pattern flag representation of the pattern flag in the first memory and the pattern identifier transmits the pattern flag representation to the processor.

33. The network of claim 32, wherein further to transmission of the pattern flag representation to the processor, the processor processes the pattern flag representation in accordance with processing instructions stored in a second memory of the network.

34. The network of claim 18, further comprising:
one or more substations coupled to the utility command and control center; and
a power plant that is coupled to the utility command and control center through the one or more substations.

35. The network of claim 18, wherein the error detector is operable to detect the presence of one or more erred chips of the one or more symbols and the pattern identifier is operable to determine a correlation in time between the one or more erred chips and an infrastructure waveform associated with electrical infrastructure of the Smart Grid network,
wherein when the determined correlation between the one or more erred chips and the infrastructure waveform indicates the electrical infrastructure as a source of detectable radio frequency interference to the wireless network device in the Smart Grid network, the pattern identifier generates the pattern flag, and
wherein one or more of the pattern flag and a pattern flag representation of the pattern flag are usable to control transmission of packets to the wireless network device to substantially avoid transmission of the packets to the wireless network device during one or more interference periods having a determined correlation between the one or more erred chips and the infrastructure waveform that indicates the electrical infrastructure as the source of detectable radio frequency interference to the wireless network device.

* * * * *